(12) United States Patent
Kim et al.

(10) Patent No.: US 8,657,938 B2
(45) Date of Patent: Feb. 25, 2014

(54) AIR-SUPPLY SYSTEM FOR BREATHING

(75) Inventors: Bum Su Kim, Ulsan (KR); Hong Jun Kim, Ulsan (KR)

(73) Assignees: SK Innovation Co., Ltd., Seoul (KR); SK Energy Co., Ltd., Seoul (KR)

( * ) Notice: Subject to any disclaimer, the term of this patent is extended or adjusted under 35 U.S.C. 154(b) by 24 days.

(21) Appl. No.: 13/056,705

(22) PCT Filed: Jul. 27, 2009

(86) PCT No.: PCT/KR2009/004174
§ 371 (c)(1),
(2), (4) Date: Jul. 8, 2011

(87) PCT Pub. No.: WO2010/013920
PCT Pub. Date: Feb. 4, 2010

(65) Prior Publication Data
US 2011/0259198 A1    Oct. 27, 2011

(30) Foreign Application Priority Data
Jul. 29, 2008  (KR) .................. 10-2008-0074221

(51) Int. Cl.
*B01D 46/46* (2006.01)

(52) U.S. Cl.
USPC ............ 96/117.5; 96/397; 95/1; 95/8; 95/10; 95/23

(58) Field of Classification Search
USPC .............. 96/117.5, 397; 95/1, 8, 10, 23
See application file for complete search history.

(56) References Cited

U.S. PATENT DOCUMENTS

| | | | | |
|---|---|---|---|---|
| 4,775,397 A * | 10/1988 | Porembski | ...................... | 95/286 |
| 5,071,453 A * | 12/1991 | Hradek et al. | ................. | 96/111 |
| 5,148,681 A * | 9/1992 | Lagache | ........................ | 62/48.1 |
| 6,312,328 B1 * | 11/2001 | Nakajima et al. | ............ | 454/187 |
| 6,712,876 B2 * | 3/2004 | Cao et al. | ........................ | 95/10 |
| 6,712,877 B2 * | 3/2004 | Cao et al. | ........................ | 95/10 |
| 7,294,181 B1 * | 11/2007 | Smith | ............................ | 96/397 |
| 7,533,942 B2 * | 5/2009 | Kennedy et al. | ................ | 299/12 |
| 7,695,049 B2 * | 4/2010 | Colborne | ..................... | 296/161 |
| 7,722,333 B2 * | 5/2010 | DeRosa et al. | ................ | 417/234 |
| 2007/0008104 A1* | 1/2007 | McBain | ....................... | 340/517 |
| 2007/0116584 A1* | 5/2007 | DeRosa et al. | ................ | 417/442 |

FOREIGN PATENT DOCUMENTS

| | | |
|---|---|---|
| JP | 2002-286251 | 10/2002 |
| JP | 2007-054096 | 3/2007 |
| KR | 20-0162267 | 12/1999 |
| KR | 20-0319772 | 7/2003 |
| KR | 100677827 | 1/2007 |

* cited by examiner

*Primary Examiner* — Christopher P Jones
(74) *Attorney, Agent, or Firm* — Abelman, Frayne & Schwab

(57) ABSTRACT

Disclosed is a system for supplying breathing air to a work space, which adopts a triple air-supply structure including a main air-supply unit for compressing, drying and filtering air supplied from the atmosphere so that breathing air is supplied to the work space, a plant air-supply unit for supplying industrial air used in a process plant to the work space, and an emergency air-supply unit for supplying breathing air to the work space in an emergency, wherein the operation of respective air-supply units is organically controlled, thus increasing the reliability of the air supply.

15 Claims, 3 Drawing Sheets

AIR-SUPPLY SYSTEM FOR BREATHING

CROSS REFERENCE TO RELATED APPLICATION

This application is a national stage entry of PCT/KR09/04174, filed on Jul. 27, 2009, which claims the benefit of Korean Patent Application No. 10-2008-0074221, filed Jul. 29, 2008, entitled "AIR-SUPPLY SYSTEM FOR BREATHING," both of which are incorporated by reference in their entirety into this application.

BACKGROUND OF THE INVENTION

1. Technical Field

The present invention relates to a system for supplying breathing air, and more particularly to a system for supplying breathing air, which includes a triple air-supply structure to thus increase the reliability of air supply.

2. Description of the Related Art

In industrial sites, there are many situations where working within a closed space is required. Because there is insufficient fresh air from outside supplied to the closed work space, the additional supply of breathing air to workers is essentially required.

Particularly in petrochemical-related fields, waste catalysts used during the processing are collected from reactors by workers. However, not only dust but also chemicals harmful to the human body remain in the reactors, and thus it is essential to supply fresh breathing air in order to improve the working environment and health of the workers.

Conventionally, industrial air used during the processing is temporarily supplied to the work space, or workers wear an additional emergency air-supply mask.

However, the supply of industrial air used during the processing is limited depending on the demand for industrial air in the other processes. In particular, in cases where the supply of industrial air is suddenly stopped, the workers may be seriously affected. Furthermore, in cases where the industrial air is supplied to the work space without the use of an additional purifier, it may contain impurities during the supply, undesirably causing concerns about the supply of air unsuitable for breathing.

Also, in cases when air is supplied via the mask, the working efficiency of the workers may undesirably deteriorate.

SUMMARY OF THE INVENTION

Accordingly, the present invention has been made keeping in mind the problems encountered in the related art and the present invention is intended to provide a system for supplying breathing air, which may reliably supply fresh breathing air in order to improve the working environment and health of workers.

An aspect of the present invention provides a system for supplying breathing air to a work space, comprising a main air-supply unit for compressing, drying and filtering air supplied from the atmosphere so that breathing air is supplied to the work space, a plant air-supply unit for supplying industrial air used in a process plant to the work space, and an emergency air-supply unit for supplying breathing air to the work space in an emergency, wherein the plant air-supply unit is operated when air supply by the main air-supply unit is inefficient, and the emergency air-supply unit is operated when air supply by the main air-supply unit and the plant air-supply unit is inefficient or when oxygen content of the industrial air transferred from the plant air-supply unit is inappropriate for breathing air.

In this aspect, the main air-supply unit may comprise a compressor for compressing air from the atmosphere so that compressive air is supplied, a receiver tank which provides a space for receiving the compressive air and includes a pressure gauge for measuring air pressure therein, an air dryer for removing moisture of the compressive air discharged from the receiver tank, and a filtering part for removing impurities of the compressive air passed through the air dryer.

In this aspect, the pressure gauge may comprise a warning sound generator for generating a warning sound when the measured internal pressure of the receiver tank is equal to or less than a set value.

In this aspect, the main air-supply unit may further comprise a dew-point gauge for to measuring an amount of moisture of the compressive air passed through the air dryer.

In this aspect, when the amount of moisture of the compressive air measured by the dew-point gauge is equal to or higher than a set value, operation of the air dryer may be stopped, and the breathing air may be supplied to the work space from the emergency air-supply unit.

In this aspect, the filtering part may comprise a first filter for removing impurities having a particle size of 1 μm or more, a second filter for removing impurities having a particle size of 0.1 μm or more, and a third filter for removing impurities having a particle size of 0.01 μm or more.

In this aspect, a pre-filter for primarily removing impurities having a particle size of 5 μm or more may be mounted between the receiver tank and the air dryer.

In this aspect, the main air-supply unit may further comprise a carbon monoxide gauge for measuring an amount of carbon monoxide of the compressive air passed through the filtering part.

In this aspect, when the amount of carbon monoxide of the compressive air measured by the carbon monoxide gauge is equal to or higher than a set value, operation of either or both of the main air-supply unit and the plant air-supply unit may be stopped, and the breathing air may be supplied to the work space from the emergency air-supply unit.

In this aspect, an after cooler for primarily removing moisture of the compressive air so that the compressive air is adapted for an inlet air temperature condition of the air dryer may be mounted between the compressor and the receiver tank.

In this aspect, the plant air-supply unit which supplies the industrial air to the process plant transfers the industrial air so that the industrial air is supplied to the receiver tank.

In this aspect, the plant air-supply unit may comprise a backup control valve for controlling supply of the industrial air transferred from the plant air-supply unit, an oxygen analyzer for measuring the oxygen content of the transferred industrial air, and an assistant backup control valve for controlling supply of the transferred industrial air depending on the oxygen content measured by the oxygen analyzer.

In this aspect, the backup control valve may control transfer of the industrial air from the plant air-supply unit when the pressure of the receiver tank measured by the pressure gauge is equal to or less than a set value.

In this aspect, the emergency air-supply unit may comprise an air cylinder part for storing breathing air, and an emergency control valve for controlling supply of the breathing air stored in the air cylinder part to the work space.

In this aspect, the air cylinder part may comprise a plurality of air cylinder parts, and each of the air cylinder parts may comprise a plurality of air cylinders.

In this aspect, the emergency air-supply unit may further comprise a control valve for controlling opening or closing of the air cylinder part, and a pressure control valve for controlling the pressure of the breathing air supplied from the air cylinder part.

BRIEF DESCRIPTION OF THE DRAWINGS

The features and advantages of the present invention will be more clearly understood from the following detailed description taken in conjunction with the accompanying drawings, in which.

DESCRIPTION OF SPECIFIC EMBODIMENTS

Figure 1:
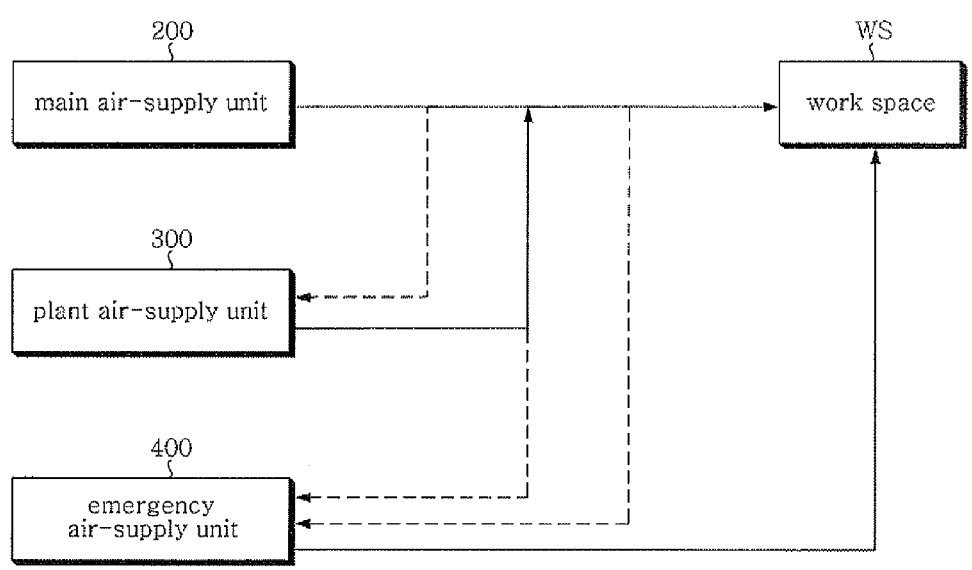
FIG. 1 is a schematic diagram showing the operation of a system for supplying breathing air according to an embodiment of the present invention.

Hereinafter, embodiments of the present invention will be described in detail while referring to the accompanying drawings. Throughout the drawings, the same reference numerals are used to refer to the same or similar constituents. Furthermore, descriptions of known techniques, even if they are pertinent to the present invention, are considered unnecessary and may be omitted in so far as they would make the characteristics of the invention unclear.

FIG. 1 is a schematic diagram showing the operation of a system for supplying breathing air according to an embodiment of the present invention.

As shown in FIG. 1, the system 100 for supplying breathing air according to the embodiment of the present invention adopts a triple air-supply structure including a main air-supply unit 200, a plant air-supply unit 300, and an emergency air-supply unit 400, and also organically controls the operation of respective air-supply units 200, 300, 400, thereby increasing reliability of the air supply.

Specifically, the system 100 for supplying breathing air is operated in such a way that breathing air is primarily supplied to the work place by means of the main air-supply unit 200, the air is secondarily supplied to the work space by means of the plant air-supply unit 300 when air supply using the main air-supply unit 200 is inefficient, and the air is tertiarily supplied by means of the emergency air-supply unit 400 when air supplied from the plant air-supply unit 300 does not meet the breathing air standards or when air supply to the work space by the main air-supply unit 200 and/or the plant air-supply unit 300 is inefficient.

Figure 2:
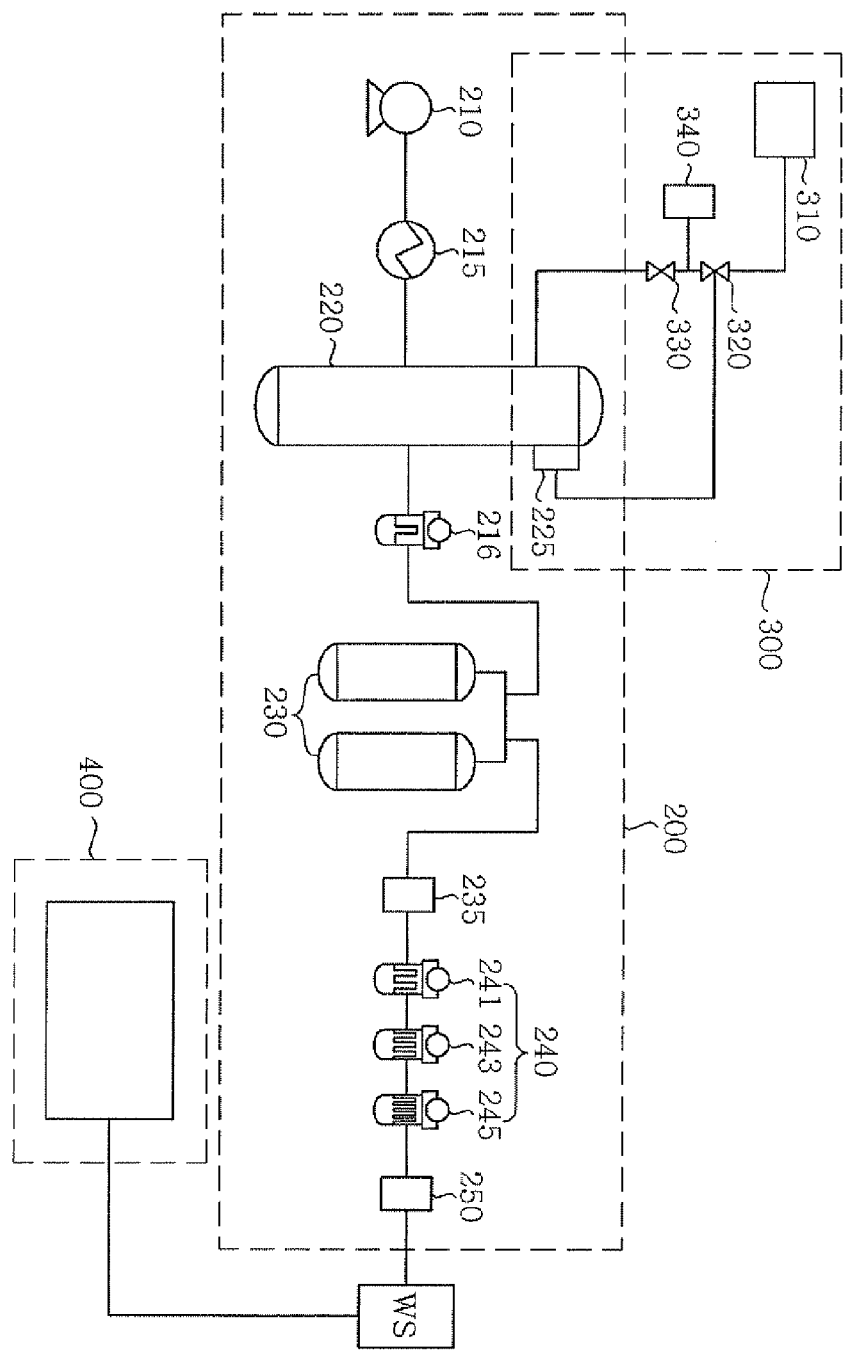
FIG. 2 is a schematic view showing the system for supplying breathing air according to the embodiment of the present invention.
Figure 3:
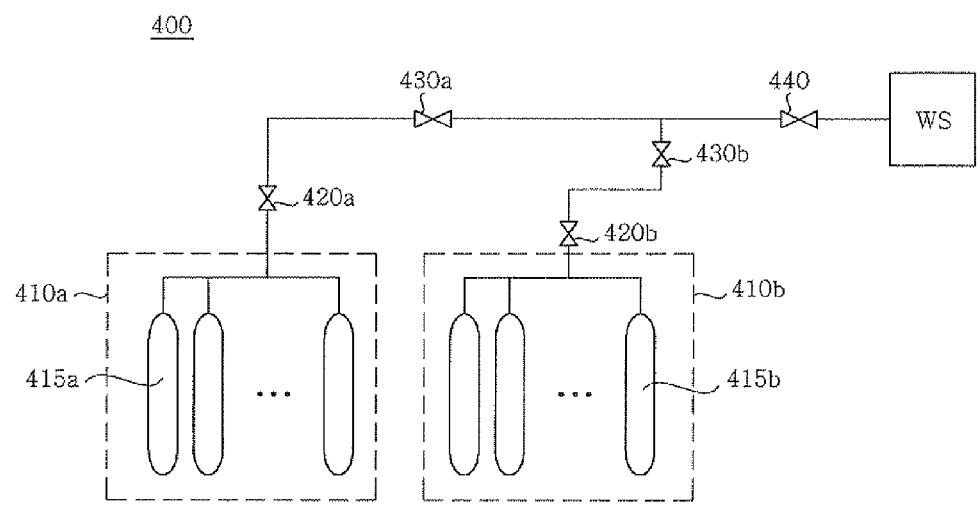
FIG. 3 is a view showing an emergency air-supply unit according to the embodiment of the present invention.

FIG. 2 schematically shows the system for supplying breathing air according to the embodiment of the present invention, and FIG. 3 shows the emergency air-supply unit 400 according to the embodiment of the present invention. With reference to these drawings, the system 100 for supplying breathing air includes the main air-supply unit 200, the plant air-supply unit 300, and the emergency air-supply unit 400.

The main air-supply unit 200 plays a role in compressing, drying or filtering air supplied from the atmosphere so that the breathing air is primarily supplied to the work space, and includes a compressor 210, a receiver tank 220, air dryers 230, and a filtering part 240.

The compressor 210 functions to compress the air fed from the atmosphere so as to supply compressive air, and an oil-free screw compressor may be used so that oil is not contained in the breathing air.

As such, the compressor 210 is exemplified by a reciprocal compressor for compressing air by reciprocal movements of a piston in a cylinder, a screw compressor for compressing air by means of two male and female screw-shaped rotors, and a turbo compressor for compressing air by rotating a turbine at a high rate (30,000~40,000 rotations/min), and supplies compressive air at a predetermined pressure (e.g. 6~7 $kgf/cm^2$).

The receiver tank 220 provides a storage space for receiving the air compressed by the compressor, and may be made of stainless steel in order to endure the pressure of the compressive air.

Furthermore, a pressure gauge 225 is mounted to one side of the receiver tank 220 in order to measure the pressure of the compressive air received in the tank. The pressure gauge 225 may include a warning sound generator (not shown) for generating a warning sound when the measured pressure is equal to or less than a set value (e.g. 6.0 $kgf/cm^2$), as well as displaying the internal pressure of the receiver tank The pressure gauge 225 is connected with a backup control valve 320 so as to control the operation of the plant air-supply unit 300 when the measured pressure is equal to or less than the set value.

Also provided between the compressor 210 and the receiver tank 220 is an after cooler 215 for primarily cooling the hot compressive air discharged from the compressor to remove moisture so as to be adapted for inlet air temperature conditions (about 35) of the air dryers before being supplied to the air dryers.

The air dryers 230 are used to remove moisture contained in the compressive air so as to meet the breathing air standards, and are connected with the receiver tank 220 via a flexible hose. The compressive air which contains a large amount of moisture is unsuitable as breathing air, and also is condensed due to the outside temperature difference and thus may promote the formation of rust on other apparatuses or devices, undesirably causing problems. For this reason, the moisture should be removed from the compressive air using the air dryers 230.

The air dryers 230 may be an adsorbing type for adsorbing water vapor from the compressive air using an adsorbent such as silica gel, alumina gel or synthetic zeolite, an absorbing type for absorbing moisture using a liquid adsorbent such as aqueous lithium chloride or tolylethylene glycol, or a cooling type for forcibly cooling air to condense water vapor.

In order to check whether the amount of moisture of the compressive air passed through the air dryers 230 is appropriate for breathing air, a dew-point gauge 235 for measuring the amount of moisture of the compressive air may be mounted. If the amount of moisture of the compressive air measured by the dew-point gauge 235 is equal to or higher than a set value, the operation of the air dryers 230 is stopped, and the air supply is controlled so that the breathing air is supplied into the work space from the emergency air-supply unit 400.

The filtering part 240 functions to remove impurities such as dust from the compressive air so as to meet the breathing air standards, and also prevents failure of other apparatuses or devices due to impurities, and is connected with the air dryers 230 via a flexible hose.

The filtering part 240 controls the amount of impurities of the compressive air to less than 1 $mg/m^3$, and particularly less than 0.01 $mg/m^3$, so as to meet the breathing air standards. To this end, a multi-filter configuration may be adopted.

For example, a filtering part 240 having a triple configuration is illustrated in FIG. 2, and includes a first filter 241 for removing 90% or more of impurities having a particle size of 1 μm or more, a second filter 243 for removing 90% or more of impurities having a particle size of 0.1 μm or more, and a third filter 245 for removing 90% or more of impurities having a particle size of 0.01 μm or more.

As shown in FIG. 2, in order to remove impurities having a large particle size (e.g. 5 μm or more) before air supply to the air dryers 230, a pre-filter 216 may be mounted between the receiver tank 220 and the air dryers 230.

Furthermore, in order to check whether the amount of carbon monoxide contained in the compressive air passed through the filtering part 240 is appropriate for breathing air, a carbon monoxide gauge 250 may be mounted. If the amount of carbon monoxide of the compressive air measured by the carbon monoxide gauge 250 is equal to or higher than a set value (5 ppm), the operation of either or both of the main air-supply unit 200 and the plant air-supply unit 300 is stopped, and the breathing air is controlled so as to be supplied to the work space from the emergency air-supply unit 400.

The plant air-supply unit 300, which supplies industrial air to a process plant, is used to transfer industrial air to the system 100 for supplying breathing air so that the breathing air is secondarily supplied to the work place, when the pressure of the air supplied from the main air-supply unit 200 is equal to or less than a standard pressure. In the case where the industrial air transferred from the plant air-supply unit 300 is suitable as breathing air, this air is supplied to the receiver tank 220 by means of the backup control valve 320.

When the measured pressure of the receiver tank 220 is less than a set value (e.g. 6 kgf/cm$^2$), the backup control valve 320, which is connected with the pressure gauge 225 for measuring the pressure of the receiver tank 220, is opened so that the tank receives the industrial air from the plant air-supply unit 300.

On the other hand, the industrial air transferred from the plant air-supply unit 300 is short of oxygen content and is thus unsuitable for use as breathing air. Hence, the supply of industrial air may be controlled depending on the results of the oxygen content of the industrial air measured using an oxygen ($O_2$) analyzer 340. As such, the oxygen analyzer 340 may be mounted between the backup control valve 320 and the receiver tank 220. If the industrial air is unsuitable as breathing air, the supply thereof is blocked by means of an assistant backup control valve 330.

The oxygen analyzer 340 is used to analyze the oxygen content of industrial air so as to control whether the assistant backup control valve 330 is opened or closed. In cases where the oxygen content is less than 21%, the assistant backup control valve 330 is controlled to be closed. This oxygen analyzer 340 may be an electrochemical cell type oxygen analyzer including an electrochemical cell type oxygen sensor and a transmitting circuit for outputting a standard current signal in proportion to a concentration in response to the electrical signal of the oxygen sensor, in order to minimize the effects of ambient temperature and interference gas.

The emergency air-supply unit 400 functions to tertiarily supply the breathing air during evacuation of the workers from the work space in an emergency in which the air supply is inefficient from the main air-supply unit 200 and the plant air-supply unit 300. Specifically, when the pressure of the air transferred to the work space by means of the main air-supply unit 200 and the plant air-supply unit 300 is equal to or less than a set value (e.g. 4.5 kgf/cm$^2$) or when the oxygen content of the industrial air supplied from the plant air-supply unit 300 is equal to or less than a set value (oxygen concentration: 21%), the emergency air-supply unit 400 is controlled so that the breathing air is supplied to the work space.

As such, the emergency air-supply unit 400 may be automatically controlled to deal with an emergency situation. In the case where the operating conditions of the emergency air-supply unit 400 are generated as above, an emergency control valve 440 may be mounted so as to be automatically opened.

The emergency air-supply unit 400 includes an air cylinder part 410a, 410b for receiving a predetermined amount of breathing air. As such, the air cylinder part 410a, 410b may comprise a plurality of air cylinder parts 410a, 410b, and each of the air cylinder parts 410a, 410b includes a plurality of air cylinders 415a, 415b. When the plurality of air cylinder parts 410a, 410b and/or the plurality of air cylinders 415a, 415b are provided in this way, emergency air may be reliably supplied to the work space upon partial failure thereof. For the sake of description, two cylinder parts 410a, 410b are illustrated in FIG. 3, but the present invention is not limited thereto.

Furthermore, the emergency air-supply unit 400 may include control valves 420a, 420b for respectively controlling the opening or closing of the air cylinder parts 410a, 410b. Also, because high-pressure breathing air is stored in the air cylinder parts 410a, 410b, pressure control valves 430a, 430b for controlling the pressure of the breathing air discharged from the air cylinder parts 410a, 410b may be further provided in order to supply breathing air at predetermined pressure to the work space.

Although not shown in the drawing, respective valves of the emergency air-supply unit 400 may be controlled automatically/manually to deal with an emergency situation. Further, a warning sound generator may be attached so that a warning sound is generated when failure occurs.

As described hereinbefore, the present invention provides a system for supplying breathing air. According to the present invention, a triple air-supply structure is adopted to supply air to the work space, and the operation of respective air-supply units is organically controlled, thereby increasing the reliability of the air supply.

Also according to the present invention, a means for checking whether the supplied air is suitable as breathing air is provided. If the air is unsuitable for use as breathing air, an emergency air-supply unit is operated, whereby fresh breathing air can be supplied to the workers even in an emergency.

Although the embodiments of the present invention regarding the system for supplying breathing air have been disclosed for illustrative purposes, those skilled in the art will appreciate that a variety of different modifications, additions and substitutions are possible, without departing from the scope and spirit of the invention as disclosed in the accompanying claims. Accordingly, such modifications, additions and substitutions should also be understood as falling within the scope of the present invention.

What is claimed is:

1. A system for supplying breathing air to a workspace, comprising:
  a main air-supply unit for compressing, drying and filtering air supplied from atmosphere so that breathing air is supplied to the work space;
  a plant air-supply unit for supplying industrial air used in a process plant to the work space; and
  an emergency air-supply unit for supplying breathing air to the work space in an emergency,
  wherein the main air-supply unit comprises:
  a compressor for compressing air from the atmosphere so that compressed air is supplied;

a receiver tank which provides a space for receiving the compressed air and includes a pressure gauge for measuring air pressure therein;

an air dryer for removing moisture of the compressed air discharged from the receiver tank; and a filtering part for removing impurities of the compressed air passed through the air dryer, wherein the plant air-supply unit is operated when the measured pressure of the receiver tank is less than 6 kgf/cm$^2$, and the emergency air-supply unit is operated when the pressure of an air transferred to the work space by the main air-supply unit and the plant air-supply unit is less than 4.5 kgf/cm$^2$ or when an oxygen content of the industrial air transferred from the plant air-supply unit is less than 21% of oxygen concentration.

2. The system of claim 1, wherein the pressure gauge comprises a warning sound generator for generating a warning sound when the measured internal pressure of the receiver tank is equal to or less than a set value.

3. The system of claim 1, wherein the main air-supply unit further comprises a dew-point gauge for measuring an amount of moisture of the compressed air passed through the air dryer.

4. The system of claim 3, wherein when the amount of moisture of the compressed air measured by the dew-point gauge is equal to or higher than a set value, operation of the air dryer is stopped, and the breathing air is supplied to the work space from the emergency air-supply unit.

5. The system of claim 1, wherein the filtering part comprises:
    a first filter for removing impurities having a particle size of 1 μm or more;
    a second filter for removing impurities having a particle size of 0.1 μm or more; and
    a third filter for removing impurities having a particle size of 0.01 μm or more.

6. The system of claim 1, wherein a pre-filter for primarily removing impurities having a particle size of 5 μm or more is mounted between the receiver tank and the air dryer.

7. The system of claim 1, wherein the main air-supply unit further comprises a carbon monoxide gauge for measuring an amount of carbon monoxide of the compressed air passed through the filtering part.

8. The system of claim 7, wherein when the amount of carbon monoxide of the compressed air measured by the carbon monoxide gauge is equal to or higher than a set value, operation of either or both of the main air-supply unit and the plant air-supply unit is stopped, and the breathing air is supplied to the work space from the emergency air-supply unit.

9. The system of claim 1, wherein an after cooler for primarily removing moisture of the compressed air so that the compressed air is adapted for an inlet air temperature condition of the air dryer is mounted between the compressor and the receiver tank.

10. The system of claim 2, wherein the plant air-supply unit which supplies the industrial air to the process plant transfers the industrial air so that the industrial air is supplied to the receiver tank.

11. The system of claim 10, wherein the plant air-supply unit comprises:
    a backup control valve for controlling supply of the industrial air transferred from the plant air-supply unit;
    an oxygen analyzer for measuring an oxygen content of the transferred industrial air; and
    an assistant backup control valve for controlling supply of the transferred industrial air depending on the oxygen content measured by the oxygen analyzer.

12. The system of claim 9, wherein the backup control valve controls transfer of the industrial air from the plant air-supply unit when the pressure of the receiver tank measured by the pressure gauge is equal to or less than a set value.

13. The system of claim 1, wherein the emergency air-supply unit comprises:
    an air cylinder part for storing breathing air; and
    an emergency control valve for controlling supply of the breathing air stored in the air cylinder part to the work space.

14. The system of claim 13, wherein the air cylinder part comprises a plurality of air cylinder parts, and each of the air cylinder parts comprises a plurality of air cylinders.

15. The system of claim 13, wherein the emergency air-supply unit further comprises:
    a control valve for controlling opening or closing of the air cylinder part; and
    a pressure control valve for controlling a pressure of the breathing air supplied from the air cylinder part.

* * * * *